(12) United States Patent
Vlajnic

(10) Patent No.: US 6,212,228 B1
(45) Date of Patent: Apr. 3, 2001

(54) APPARATUS FOR MODULATION AND DEMODULATING DIGITAL DATA

(75) Inventor: Milan Vlajnic, Gaithersburg, MD (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/073,902

(22) Filed: May 6, 1998

Related U.S. Application Data

(60) Provisional application No. 60/058,444, filed on Sep. 10, 1997.

(51) Int. Cl.[7] ................................................. H04B 1/38
(52) U.S. Cl. ................................................. 375/222; 379/406
(58) Field of Search ........................... 375/220, 221, 375/222, 242, 316, 295, 265, 241; 455/557, 73; 370/278, 287; 341/50, 143, 142, 110, 126; 379/402, 406, 93.01

(56) References Cited

U.S. PATENT DOCUMENTS

| 4,991,169 | | 2/1991 | Davis et al. . | |
| 5,132,963 | * | 7/1992 | Ungerboeck | 370/286 |
| 5,309,484 | * | 5/1994 | McLane et al. | 375/354 |
| 5,521,949 | * | 5/1996 | Huang et al. | 375/377 |
| 5,612,974 | * | 3/1997 | Astrachan | 375/295 |
| 5,625,651 | * | 4/1997 | Cioffi | 375/354 |
| 5,724,393 | * | 3/1998 | Dagdeviren | 375/296 |
| 5,793,809 | * | 8/1998 | Holmquist | 375/242 |
| 5,818,870 | * | 10/1998 | Yaguchi | 375/219 |
| 5,864,545 | * | 1/1999 | Gonikberg et al. | 370/286 |
| 5,953,376 | * | 9/1999 | Wei | 375/265 |
| 5,991,278 | * | 11/1999 | Betts | 370/276 |
| 5,995,540 | * | 11/1999 | Draganic | 375/222 |
| 6,112,269 | * | 8/2000 | Nordling | 710/69 |

* cited by examiner

Primary Examiner—Chi H. Pham
Assistant Examiner—Emmanuel Bayard
(74) Attorney, Agent, or Firm—Blakely, Solokoff, Taylor & Zafman LLP

(57) ABSTRACT

A modem comprising entirely digital components and circuitry for receiving a digital signal of a first format from a first device, converting the digital signal to a digital signal of a second format and transmitting the digital signal of a second format to a second device. In one embodiment, a digital signal processor replaces at least a portion of the digital components and circuitry for receiving a digital signal of a first format and converting the digital signal to a digital signal of a second format and transmitting the digital signal of a second format to a second device.

25 Claims, 7 Drawing Sheets

APPARATUS FOR MODULATION AND DEMODULATING DIGITAL DATA

This non-provisional patent application claims the benefit of U.S. Provisional Application Ser. No. 60/058,444, filed Sep. 10, 1997, entitled, "METHOD FOR DYNAMICALLY DOWNLOADING A SOFTWARE IMAGE TO A DIGITAL MODEM."

COPYRIGHT NOTICE

Contained herein is material which is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention is related to the field of high speed modems for use in telecommunications. More specifically, the present invention is related to a modem comprised entirely of digital components. No analog to digital (A/D) or digital to analog (D/A) converters are utilized by the modem of the present invention when modulating or demodulating data transmitted to or received from a digital transmission medium, thereby increasing performance while decreasing cost of the modem. Additionally, a DSP-based embodiment of the modem of the present invention may be dynamically configured by downloading a software image.

2. Description of the Related Art

With respect to FIG. 1A, a traditional telecommunications path is illustrated over which a computer such as Personal Computer (PC) 100 communicates with another computer such as PC 160. The communication utilizes the Public Switched Telephone Network (PSTN) as may be necessary with communication between computers that are separated by a distance greater than can be accommodated by present Local Area Network (LAN) technology. The computers may communicate with each other as part of a client-server network, or to exchange electronic mail, or the like.

PC 100 is shown connected to a MOdulator/DEModulator (modem) 110 over line 170. Line 170 is typically an asynchronous link, e.g., an RS-232 line that transmits and receives data as a digital signal 160 as indicated in FIG. 1A. Modem 110 converts the digital signal 160 originating from PC 100 to an analog signal 161 for transmission over analog line 171, commonly referred to as a "local loop". In this particular example, modem 110 is external to PC 100. However, it is understood that modem 110 may be internal to PC 100, in which case, line 170 is unnecessary. In either case, modem 110 operates in the same manner. Likewise, PC 160, line 175 and modem 150 function in the same manner as described for PC 100, line 170 and modem 110, to provide analog signal 163 for transmission over line 174, the analog local loop with respect to PC 160.

Analog Transmission over the Local Loop

A computer, just like a telephone, is commonly connected to a Central Office Exchange (CO) over a "local loop". This local loop is commonly a single pair of wires that transmits and receives voice or data transmissions in the form of an analog signal. For example, PC 100 transmits a digital signal 160 containing data to modem 110, which converts the digital signal to an analog signal 161 for transmission over analog line 171. Line 171 represents a local loop between PC 100/modem 110 and CO 120.

While the local loop today carries voice and data transmissions, it originally carried only voice transmissions. Voice signals are, of course, characterized by an analog, not digital, waveform of varying amplitude and frequency. Voice frequency bandwidth, i.e., voiceband, is approximately 4000 Hz, but the frequency band actually passed in the telephone network is in the 300 Hz to 3000 Hz range, which is adequate for the human ear to recognize basic qualities associated with speech such as voice recognition, intonation, emotion, etc. This frequency range was chosen as a compromise—increasing the frequency range results in better voice quality, but at a greater expense. Hence, the local loop was initially designed to transmit analog signals of limited bandwidth.

Virtually every home or small business initially transmitted voice information as an analog signal over a local loop comprised of a twisted wire pair to a local telephone company's CO. Presently, particularly in metropolitan areas, the pair of wires comprising the local loop is being replaced by a transmission medium, e.g., wire, fiber optic or radio, capable of transmitting voice and data as a digital signal. However, the local loop portion of the worldwide telecommunications infrastructure remains overwhelmingly analog. Thus, there is an ongoing need for modems to convert from digital to analog signals when transmitting data over the local loop or to convert from analog to digital signals when receiving data over a local loop.

While the local loop remains mostly analog, the switching systems in the central office and transmission lines in the PSTN are commonly digital. Thus, a brief review of CO systems and digital transmission systems utilized in the PSTN, such as T1, is useful for an understanding of the present invention.

Digital Transmission over the PSTN

A Central Office (CO) is a switching system operated by a local phone company for connecting, maintaining and releasing a local call between two devices, such as telephones, facsimile machines, or modems, within the geographical area managed by the local office. A toll, or long distance connection between devices in different cities or states, however, requires utilization of the Public Switched Telephone Network (PSTN). For example, given a scenario in which telephones are located in different cities or states managed by separate COs, the PSTN provides an interconnection between the COs so that the telephones can establish a toll call for voice transmission between them. While a local loop transmits a single local call at a time, the PSTN multiplexes multiple toll calls at the same time over the same transmission medium utilizing, for example, a time division multiplexing (TDM) technique, to improve the efficiency of the PSTN.

Additionally, digital transmission techniques are often utilized to further enhance the performance and efficiency of the PSTN. As a result, analog signals transmitted by a telephone over the local loop to a local central office are generally converted to digital signals and coded, for example, using Pulse Code Modulation (PCM) techniques, at the local central office before being transmitted over the PSTN. The digital signals may then be decoded and converted back to analog signals at a receiving central office to recover the voice transmission before being transmitted over another analog local loop to a receiving telephone. Thus, a central office utilizes a COder/DECoder (CODEC) to convert analog signals received from an attached local loop to an encoded digital data stream for transmission over the PSTN.

Likewise, a CODEC in the receiving CO decodes the encoded digital data stream received from the PSTN into analog signals for transmission over the local loop. As will be discussed below, if the local loop to which a receiving telephone is connected is capable of carrying digital transmissions, the digital signals need not be converted back to analog signals at the receiving central office, but may be transmitted as digital signals until converted to analog signals at the receiving telephone.

Analog to Digital /Digital to Analog Conversion

Given that the local loop portion of the telephone network is generally analog and the PSTN portion is generally digital, the need for analog to digital and digital to analog signal conversion at the CO is readily apparent. For example, with respect to FIG. 1A, digital signals 160 representing data transmitted from PC 100 must be converted to analog signals 161 at modem 110. At CO 120, the analog signals are converted to digital signals 162 for transmission over PSTN 130. Again at CO 140, the digital signals are converted to analog signals 163 and transmitted to modem 150, where the analog signals are converted yet again to digital signals 164 for transmission to PC 160.

Recall that human speech produces an analog waveform of varying amplitude within a frequency range of 0 to 4000 Hz. To convert an analog signal with sufficient accuracy to a digital signal for transmission over a digital line requires sampling the analog signal at the Nyquist rate, that is, at a rate of at least twice that of the greatest frequency bandwidth of the analog signal, according to the well known Nyquist theorem. As discussed above, the voice channel bandwidth is approximately 4000 Hz. Thus, a sampling rate of 8000 samples per second is necessary to convert an analog signal in the voice channel bandwidth to a digital signal. Many methods for sampling analog signals exist in the prior art, including Pulse Code Modulation (PCM), briefly reviewed below.

Pulse Code Modulation Techniques

Pulse Code Modulation (PCM) samples an analog signal over a period of time and converts the sample to a number selected from a range of numbers, which number most closely approximates the amplitude of the sample. More specifically, a sample of an analog signal is taken over a certain period of time, e.g., 0.125 milliseconds for a signal sampled at a rate of 8000 times per second. The sample, in turn, is converted to a number assigned to represent a sample whose amplitude falls within a defined range of amplitudes. The process of approximating the sample with a number is known as quantization. The range of amplitudes within which a sample falls is known as the quantization interval. The difference between the actual amplitude value of the sample and the number representing the quantization interval between which the sample falls is known as quantization error.

An encoder, or simply coder, at the central office samples an analog signal, quantizes the sample into a number, and then codes the number into a series of bits representing the number. Typically, a limited number of bits, e.g., eight, are utilized to represent the number. Eight bits per quantized number multiplied by 8000 samples per second produces a bit rate of 64000 bits per second (bps). Thus, a CO samples, quantizes and codes an analog signal received over the local loop into a 64000 bps PCM signal for transmission over the PSTN. Likewise, a decoder in the CO receiving the PCM signal decodes it and converts the decoded results back to analog signals for transmission over a local loop connected to the receiving device, e.g., a telephone. (The COder and DECoder in a CO are often part of the same Integrated Circuit (IC) in a CO, which IC is generally referred to as a CODEC.)

The quantization error introduced in the analog to digital conversion of a signal produces noise, which is often heard on a telephone receiver as a hissing sound in the voiceband. Reducing quantization noise is therefore desirable. By compressing the size of quantization intervals with respect to the analog signal such that quantization intervals are smaller for relatively small analog signals and larger for relatively large analog signals, quantization noise is reduced. Adjusting the quantization intervals in this manner results in compression of the quantized and coded signal. Accordingly, upon receiving a compressed PCM digital transmission, the decoder portion of the CODEC in a CO first expands the digital signal. Typically, a COMpressor/exPANDER (COMPANDER) unit in a CODEC compresses the PCM signal and expands the corresponding compressed PCM signal. To achieve interoperability in a public switched telephone network, CODECs adhere to a standard for compressing and expanding a PCM digital signal such as the well known -law or "mu-law" compander (U.S.) or A-law compander (Europe) standards.

T1 Digital Transmission

As discussed above, voice and/or data signals are typically transmitted over the local loop as analog signals and received by a local Central Office (CO), where they are sampled, quantized, and coded into digital signals according to a modulation technique such as the companded PCM digital coding technique. As a result, the digital signals can be transmitted over the PSTN at much higher frequencies such that multiple digital signals can be time division multiplexed over a single transmission medium, e.g., a T1 line (in the U.S., or E1 line in Europe). Each signal is commonly referred to as a channel.

A T1 line is capable of transmitting 24 multiplexed digital channels ("DSOs") plus 8000 bits of framing information per second. The framing information concerns where each DSO starts and stops in the T1 bit stream. Recall from the above discussion that each PCM digital signal transmits 64000 bits per second. 24 channels multiplied by 64000 bits per second plus 8000 bit per second for framing information equals 1.544 Mbps. Thus, a T1 line must be capable of transmitting data at a maximum rate of 1,544,000 bits per second (1.544 Mbps). Additional digital transmission systems such as T3, D4, ESF (Extended Superframe) operate on similar principles as the T1 line and offer similar or greater advantages.

Central Office Systems

As discussed above, the central office typically receives an analog signal from the local loop and converts it to a digital signal such as a compressed PCM digital signal for transmission over the PSTN. For example, with reference to FIGS. 1A and 1B, central office 120 receives an analog signal 161 from modem 110 over the local loop represented by line 171. CO 120 receives the analog signal at local loop interface 120a, which provides battery, voltage protection, ringing, supervision and other functions related to interfacing with the local loop. As is well known in the art, hybrid 120b receives the analog signal from local loop interface 120a and performs two wire to four wire conversion for transmission of the signal over longer distances. Before the analog signal can be sampled by CODEC 120d, it first passes through a band pass filter 120c1 to ensure the proper frequency range, e.g., 300 Hz to 3000, is sampled.

A coder subsystem 120d1 of CODEC 120d then converts and compresses the analog signal received from bandpass filter 120c1 to a compressed PCM digital signal 162 appropriate for transmission over a channel in a T1 transmission system 172 or the like through PSTN 130. Similarly, decoder subsystem 120d2 of CODEC 120d converts and expands a compressed PCM digital signal 162 received from a channel of T1 transmission system 172 to an analog signal, which is then smoothed at filter 120c2 before being transmitted over hybrid 120b and local loop interface 120a to the local loop 171. Importantly, quantization error occurs only in the analog to digital conversion process performed by CODEC 120d when the analog signal received from the local loop is approximated, i.e., quantized. No further quantization error occurs, however, when converting the digital signal received from the PSTN to an analog signal.

Digital Local Loop

Analog modems are necessarily utilized to convert digital signals received from an attached device such as a PC to analog signals for transmission over an analog local loop to the central office. Conversely, analog modems are utilized to convert analog signals received over the analog local loop to digital signals for transmission to an attached device such as a PC. Analog modems use various standard modulation and demodulation techniques to perform the conversion (e.g., V.22bis, V.32bis). However, analog modems inefficiently utilize the telecommunications network since they transmit analog data at, for example, 14,400 bits per second over the local loop, yet each local loop is assigned to a DS0 capable of transmitting a digital version of the data at 64,000 bits per second from the central office over the PSTN.

V.32 modems are capable of bit rates up to 57,600 bits per second using 4:1 data compression, but data compression is not always possible depending on the data being compressed and/or the line quality of the local loop. Using advanced signal processing techniques, V.34 modems can theoretically achieve bits rates of up to 115,200 bits per second using 4:1 data compression. However, as a practical matter, such modems generally provide significantly slower bits rates under typical line conditions. Additionally, CODECs are employed at the CO to convert analog signals received over an attached local loop to digital signals for transmission over the PSTN. The conversion results in quantization error as described above. A local loop capable of carrying digital signals removes the need for CODECs at the Central Office, and avoids the quantization error otherwise induced by the CODEC in converting analog signals to digital signals.

Thus, the analog local loop is increasingly being replaced by a digital local loop, particularly where the device attached at the end of the loop opposite the central office is a computing device such as a server, mainframe computer, or switch, providing access to online services or the like for multiple clients. The modem connecting the computing device to the digital local loop is a "digital modem". However, the so-called digital modem is essentially a standard modem that converts analog signals otherwise transmitted over an analog local loop into a digital data stream for transmission over a digital local loop.

In such cases, a digital signal received at the central office from the PSTN does not need to be expanded and converted to analog before it is transmitted over the digital local loop to a destination computing device. Rather, the digital signal passes unchanged through the CO to the destination device. Under these circumstances, the CODEC and filtering functions typically performed at the CO necessarily migrate from the CO to the destination device or digital modem connected to or incorporated as part of the destination device. As with the CO, however, the prior art CODEC comprises analog components that induce quantization error as the digital signal received from the CO over the digital local loop is converted to analog and back to digital to recover the data transmitted by the device at the other end of the end-to-end connection.

For example, FIG. 2A illustrates a PC 100 capable of communicating with computing device 220 (which is perhaps a server, mainframe computer, or another PC) over a PSTN 130 and a Local Area Network or Wide Area Network (LAN/WAN) 212. PSTN 130 and LAN/WAN 212 are communicatively coupled via a Remote Access Server (RAS) 210. A modem 110 (not shown) is internal to PC 100, which is corrected to a local CO 120 over an analog local loop represented by line 171. A digital data stream 160 generated by PC 100 is converted to analog signals 161 via the internal modem before being sent over analog line 171 to CO 120. A CODEC within CO 120 converts the analog signals into compressed PCM digital signals 262 for transmission over, e.g., a T1 channel in PSTN 130. The compressed PCM digital signals are received at a remote CO 140 and transmitted unchanged over line 211 to RAS 210. At RAS 210, the compressed PCM digital signals are expanded and then converted to analog signals 265 as an intermediate step performed by a modem associated with RAS 210 (not shown) to recover the original data transmitted by PC 100 over local loop 171. The conversion to analog signals is an intermediate step because the data stream is then converted by the modem to digital signals 266 for transmission over LAN/WAN 212 to computing device 220. Line 211 is a digital local loop utilizing, e.g., an Integrated Services Digital Network (ISDN) or T1 transmission system. Thus, while the CODEC functionality remains with CO 120, because line 211 between RAS 210 and CO 140 provides for digital signal transmission, the CODEC functionality migrates to a modem utilized by RAS 210.

Interestingly, a modem such as utilized by RAS 210 in FIG. 2A is known as a digital modem because it transmits and receives digital signals in both directions, notwithstanding that it performs intermediate digital to analog (D/A) and analog to digital (A/D) conversions for interpolation from a digital signal of one format, e.g., companded PCM digital signals, to a digital signal of another format, e.g., Manchester encoded digital signals as may be utilized in an IEEE 802.3 LAN or the like. As a result of the analog to digital conversion, quantization error still occurs at RAS 210 (in addition to the quantization error that occurred at CO 120 in converting the received analog signals to a digital signals), even though both lines 211 and 212 are digital transmission lines.

The communication network illustrated in FIG. 2A is one example of the use of a digital local loop 211 and so-called digital modem. While the digital local loop initially replaced the analog local loop between the CO and a server of an Internet Service Provider (ISP) or mainframe computer in a corporate intranet, increasingly, homes, home offices and small businesses have installed a digital ISDN line for digital transmission of data over the local loop to a client or PC. For example, a home office may have a PC that exchanges data with, and particularly, downloads extensive amounts of data from computing device 220 using online services such as Prodigy or CompuServe, the Internet, the World Wide Web (WWW) graphical portion of the Internet, a corporate intranet, or the like. In such case, a digital line such as an ISDN line, an ISDN terminal adapter and an ISDN compatible modem replaces analog line 171 and internal modem 110 to achieve faster response times and data throughput between PC 100 and computing device 220.

The ISDN terminal adapter and modem at PC 100, just like the so-called digital modem in RAS 210 of FIG. 2A, comprises filtering and CODEC systems for expanding and converting a compressed PCM digital bit stream received over the ISDN line to analog signals to recover the data transmitted from computing device 220. Utilization of the ISDN line avoids the use of filtering and CODEC systems at CO 120. However, due to the analog components in the prior art modem, quantization error is still introduced by the D/A and A/D conversion performed by the modem in recovering the data transmitted from computing device 220. What is needed is a truly fully digital modem capable of receiving a digital data stream of one format and converting it to a digital data stream of another format without performing the intermediate steps of D/A and A/D conversion.

Interestingly, in the prior art, this conversion of the data from digital signals to analog signals occurs regardless of whether the data was ever transmitted as analog signals over any portion of the end-to-end connection from computing device 220 to PC 100. The conversion occurs because the digital modem in or associated with PC 100 is unable to ascertain over what transmission media the data traveled, and whether that media supported analog or digital transmission of data. In other words, the digital modem is unable to ascertain if the data was transmitted as analog signals at any point in along the end-to-end connection. Moreover, the digital modem associated with PC 100 is further unable to ascertain whether the data was converted from digital-to-analog and analog-to-digital by the analog components of a so-called digital modem at some point between the computing device 220 and the modem associated with PC 100, e.g., at the digital modem associated with RAS 210. Therefore, it must be assumed that analog transmission occurred at some point in the telecommunications network, given the historical and ubiquitous nature of the analog local loop and analog components in the central office. In other words, it must be assumed that the digital signal received at the digital modem is merely an approximation of an analog signal. However, because PC 100 communicates and processes data according to a digital format, the recovered analog signals are converted by the so-called digital modem associated with the PC to a digital format appropriate for the PC.

With respect to FIG. 2B, RAS 210 comprises a modem bank 230. Modem bank 230 may be implemented on a single printed circuit board, and thus, may also be referred to as a modem card. Modem bank 230, in turn, comprises a number of prior art so-called digital modems, e.g., modems 230*a*–230*d*, each respectively connected to a separate DSO channel 225–228 to receive a compressed PCM digital bit stream from T1 line 211. T1 Data Service Unit/Communication Service Unit (DSU/CSU) 215 receives time division multiplexed digital transmissions from T1 line 211 and forwards the transmissions to multiplexer 220 which demultiplexes the transmissions into the 24 channels defined by the separate DSOs. Alternately, each modem receives a digital data stream from a computing device such as computing device 220 connected to LAN/WAN 212 and forwards the data stream to a DSO. The digital data stream is multiplexed in a TDM manner with the data streams received by the other DSOs from a corresponding modem and sent out the DSU/CSU interface and over T1 line 211. It should be noted that while the modem card is contained within RAS 210 in the prior art embodiment illustrated in FIG. 2B, the modem card may be separate from RAS 210.

According to one prior art implementation, modem bank 230 comprises up to 24 prior art digital modems each connected to a separate DSO. Each modem in the modem card is connected to an internal data bus 240 to which is connected to a controller 250 via line 248 and a network interface card 260 via line 249. Controller 250 manages access to bus 240 and stores and downloads appropriate software to each of the so-called digital modems in modem card 230. Additionally, controller 250 provides a user interface for configuring RAS 210 and performing other well known tasks associated with transmitting and receiving data over a telecommunications network such as data compression, error correction, etc. Controller 250 may also be responsible for upper-layer protocol functions and communication associated with LAN/WAN 212, e.g., routing, flow control, network management, and transmitting and receiving data packets over LAN/WAN 212 via Network Interface Card (NIC) 260.

When a modem in modem card 230 has received data from its corresponding T1 channel and is ready to transmit the data to LAN/WAN 212, controller 250 provides the modem with access to internal data bus 240, at which time the data is transmitted over bus 240 to NIC 260. NIC 260 typically encapsulates the data in packets with upper-layer protocol header/trailer information and then transmits it over line 261 to LAN/WAN 212 in accordance with the protocols for communication over LAN/WAN 212, e.g., the IEEE 802.3 Carrier Sense Multiple Access with Collision Detection (CSMA/CD) Media Access Control (MAC) protocol and Transport Control Protocol/Internet Protocol (TCP/IP) suite of protocols commonly utilized for baseband communication over a Local Area Network (LAN).

As shown in FIG. 3, a prior art so-called digital modem 230*a* further comprises filtering and CODEC systems for expanding and converting the compressed PCM digital bit stream received from the corresponding T1 channel to analog signals regardless of whether the data transmitted from PC 100 over its local loop was in the form of analog or digital signals. In any case, because LAN/WAN 212 utilizes a digital transmission medium, the modem converts the analog signals to a digital format appropriate for communication with computing device 220 over LAN/WAN 212.

With further reference to FIG. 3, digital-to-Analog Converter (DAC)/expander 345 receives compressed PCM digital signals from DSO 225, expands and decodes the signals, and converts the signals to analog format. The analog signals are then sent to bandpass filter 350 for smoothing before being converted back to digital signals at Analog-to-Digital Converter (ADC) 355. Receiver 360 buffers the digital signals before they are transmitted on internal data bus 240 where they will be received by controller 250 and/or transmitted out NIC 260 to LAN/WAN 212.

A similar process occurs when receiving a digital data stream from LAN/WAN 212 for transmission over the PSTN via T1 line 211. Data packets are received by NIC 260 from LAN/WAN 212 and placed on internal data bus 240. Controller 250 receives the data packets, decapsulates upper-layer protocol headers/trailers from the data packets if necessary, allocates a modem in modem bank 230 and corresponding DSO, and transmits the digital data stream corresponding to the decapsulated data over bus 240 to the modem, e.g., prior art digital modem 230*a*. Modem 230*a* receives the digital data stream in transmit buffer 340 before it is sent to DAC 335 for conversion to analog signals. Before the signals are converted to digital and compressed by ADC/compressor 325, low pass filter 330 filters frequencies above, e.g., 4000 Hz from the analog signals so that ADC/compressor 325 samples the signals properly and accurately.

As discussed above, the prior art so-called digital modems incorporate analog components, which are relatively expensive, large, and slow, compared to digital circuitry. Additionally, the conversion of digital signals to analog and back to digital introduces quantization error into the transmitted data, even if all communication links over which the data is transmitted are digital, and in addition to any quantization error already present in the data as a result of conversion from an analog signal to a digital signal, for example, at an analog local loop/CO interface. Thus, what is needed is a fully digital modem that receives a digital signal of a first format and converts the digital signal to a digital signal of a second format using all digital circuitry and techniques.

BRIEF SUMMARY OF THE INVENTION

Disclosed is a digital modem that is capable of receiving a digital signal having a first format and converting the digital signal to a digital signal having a second format using entirely digital components. The fully digital modem avoids the expense and performance problems associated with so-called digital modems that comprise circuitry such as D/A and A/D converters for converting the received digital signal to analog and back to digital in converting between, for example, a digital bit stream and a compressed PCM digital bit stream. The digital modem operates according to standard speeds and functionality such as defined by the V.22bis, V.32, V.32bis, and V.34 standards and is capable of operating at transmission rates of 14.4 Kbps, 28.8 Kbps, 33.4 Kbps, and 56 Kbps. Additionally, the digital modem interfaces directly with T1, E1 or ISDN Basic Rate (ISDN BRI) or ISDN Primary Rate (ISDN PRI) digital transmissions.

An embodiment of the digital modem is proposed in which a general purpose DSP is dynamically downloaded with a software image to configure the digital modem, including its functions and features.

BRIEF DESCRIPTION OF THE SEVERAL VIEWS OF THE DRAWINGS

The present invention is illustrated by way of example and not limitation in the following figures. Like references indicate similar elements, in which.

DETAILED DESCRIPTION OF THE INVENTION

The present invention relates to a modem comprised, in one embodiment, entirely of digital components capable of transmission bit rates of 56 Kbps. In another embodiment, the digital modem comprises a general purpose Digital Signal Processor (DSP) and software downloaded to the DSP to perform the modulation/demodulation of data transmitted to/from the modem. No analog to digital (A/D) or digital to analog (D/A) converters are utilized by the modem of the present invention when modulating or demodulating data transmitted to or received from a digital transmission medium, thereby increasing performance while decreasing cost of the modem.

In the following description, numerous specific details are set forth in order to provide a thorough understanding of the present invention. It will be apparent, however, to one of ordinary skill in the art that the present invention may be practiced without these specific details. In other instances, well-known architectures, circuits, and techniques have not been shown to avoid unnecessarily obscuring the present invention.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexors, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Figure 1A:
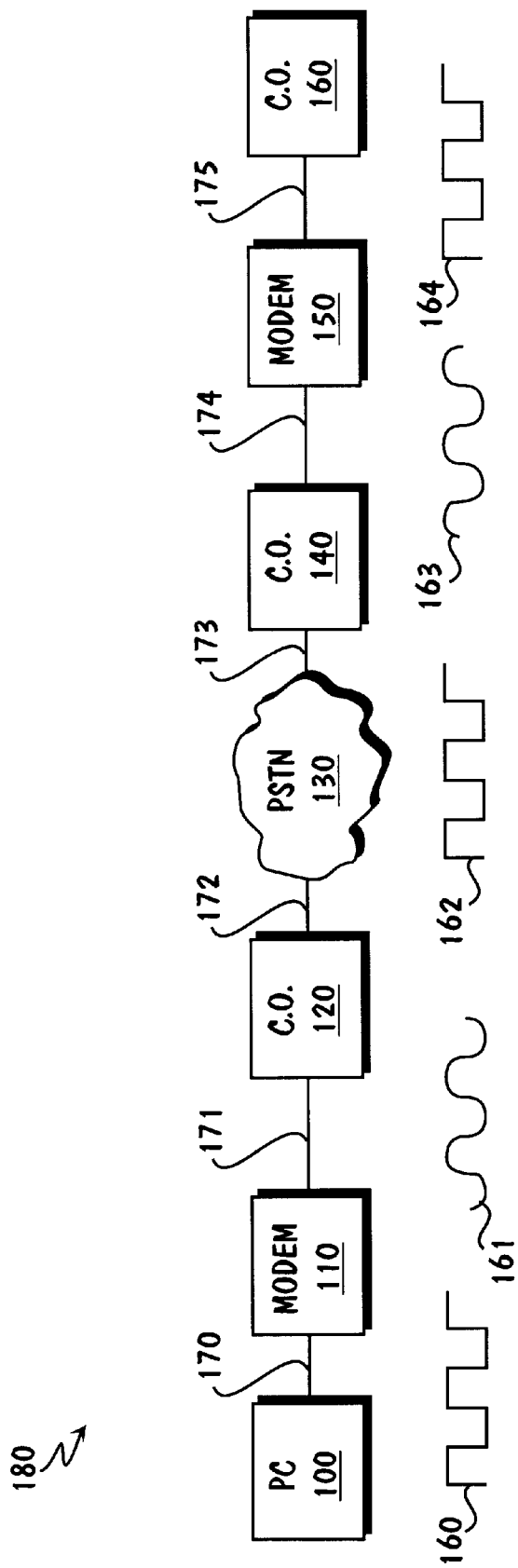
FIG. 1A is an illustration of a prior art telecommunications network utilizing analog local loops from the telephone company's central office.
Figure 1B:
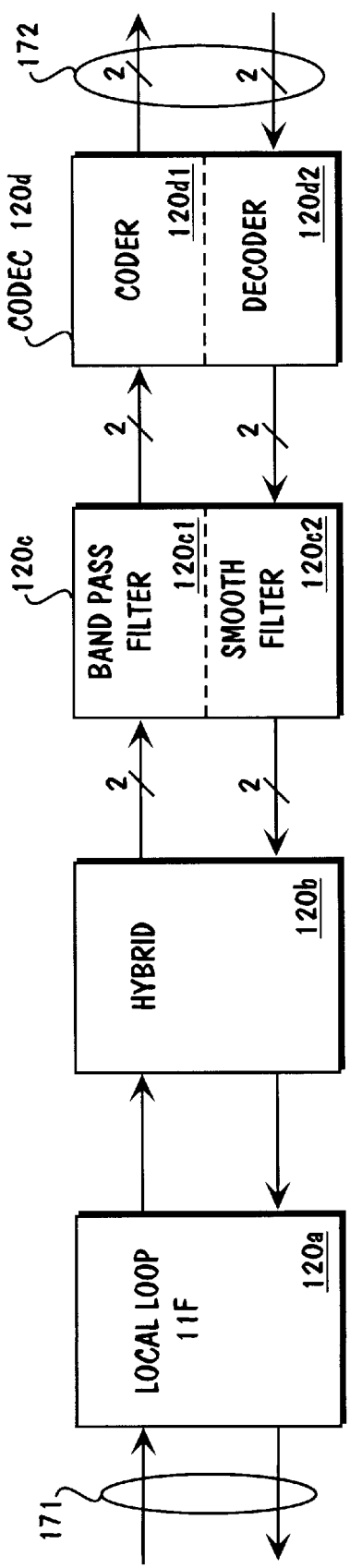
FIG. 1B is a block diagram of the prior art CODEC utilized at the central office to convert analog signals received from the local loop to digital signals for transmission over, e.g., a T1 digital channel.
Figure 2A:
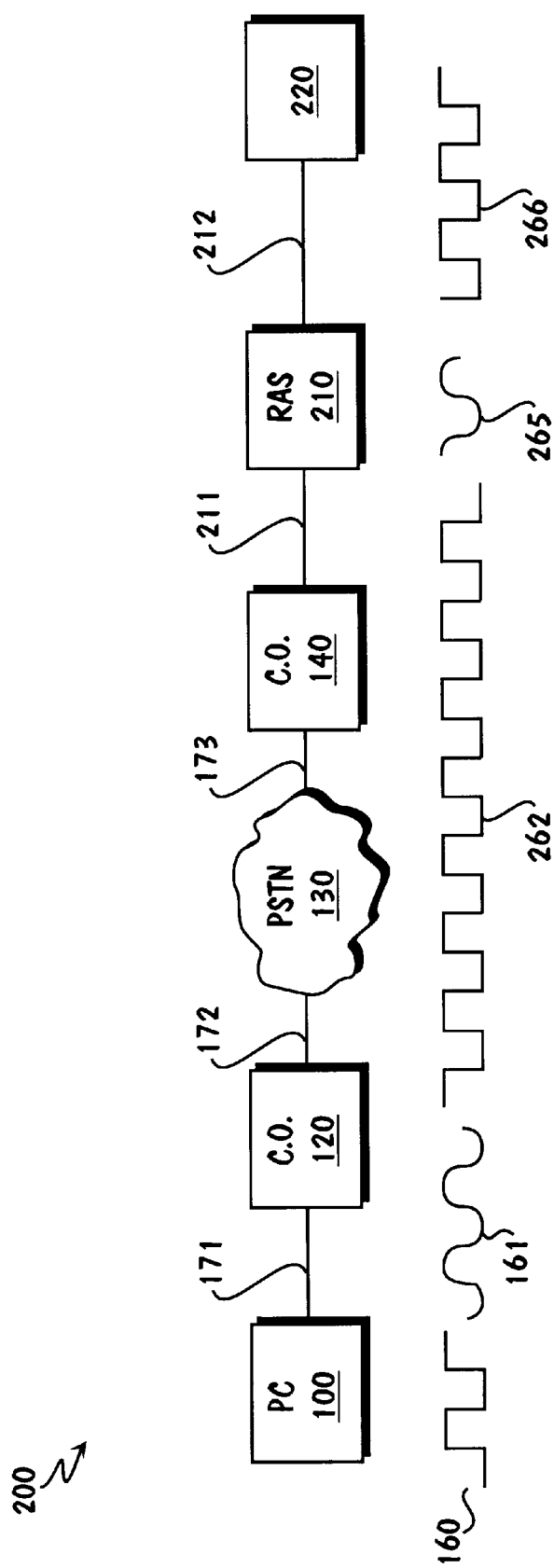
FIG. 2A is an illustration of a prior art telecommunications network utilizing a digital local loop between the remote access server and the local central office.
Figure 2B:
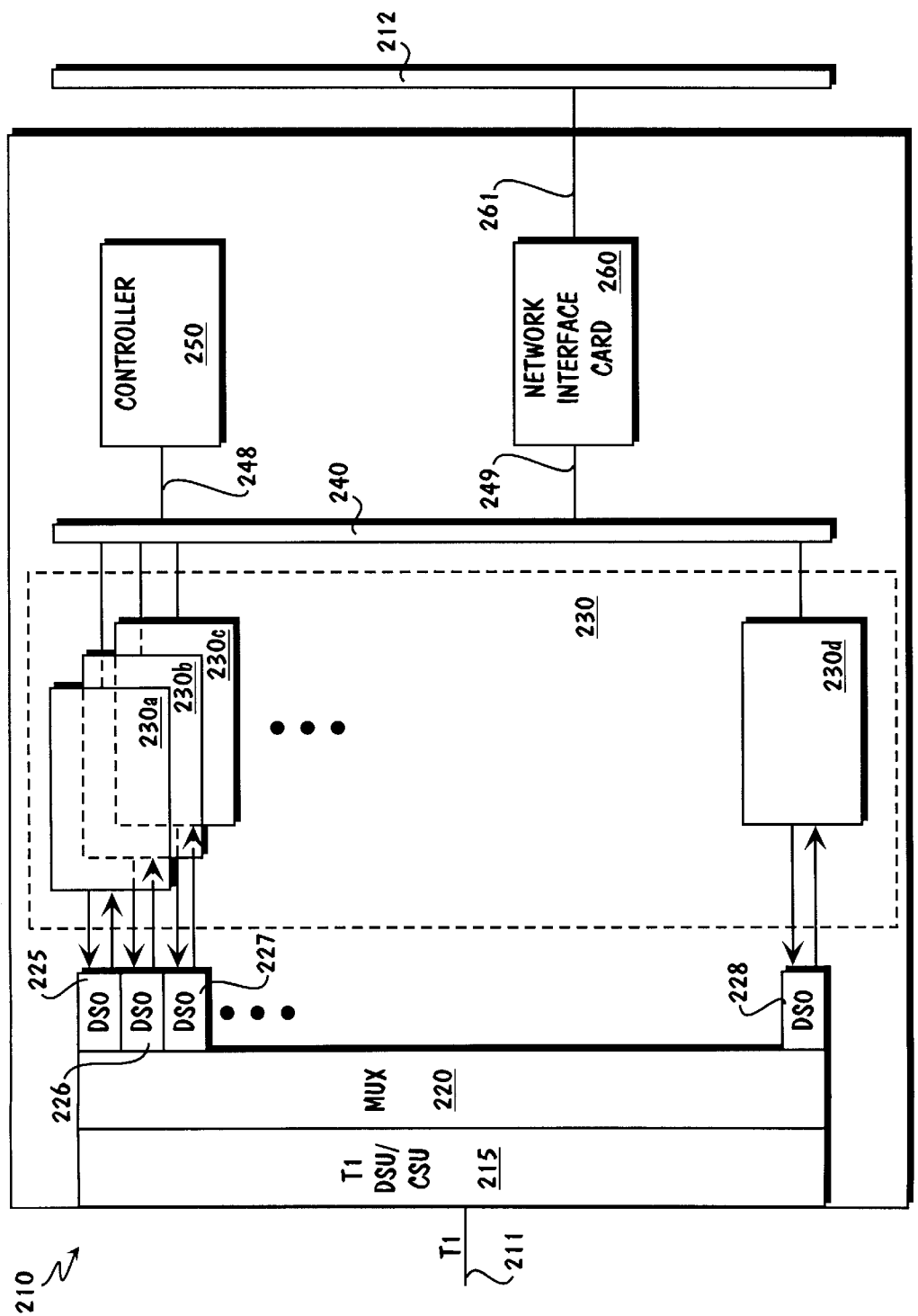
FIG. 2B is a block diagram of a remote access server having a bank of modems each connected to separate channels of the T1 transmission line.

A brief overview of the environment in which the use of an embodiment of the present invention is contemplated is now provided for a better understanding of the invention. With respect to FIG. 2B, a block diagram of a Remote Access Server (RAS) 210 is shown. The RAS, also referred to as a central site server, integrates remote access to a LAN or WAN by way of a modem bank 230 for multiple devices such as PC 100 or the like. Each modem in the modem bank 230, in turn, respectively connects to a separate DS0 channel, e.g., DS0 channel 225, to receive a compressed PCM digital bit stream from T1 line 211. T1 Data Service Unit/Communication Service Unit (DSU/CSU) 215 receives time division multiplexed digital transmissions from T1 line 211 and forwards the transmissions to multiplexer 220. Multiplexer 220 demultiplexes the transmissions into the 24 channels defined by the separate DS0s.

Alternately, each modem receives a digital data stream from a computing device such as computing device 220 connected to LAN/WAN 212 and forwards the data stream to a DS0. The digital data streams are time division multiplexed and sent over the PSTN via DSU/CSU interface 215 and T1 line 211. The individual DS0s combined into the T1 bit stream can be dropped out of or inserted into another T1 data stream as some switching point in the PSTN depending on the CO to which the data stream is being transmitted.

In RAS 210, modem card 230 comprises up to 24 modems each connected to a separate DS0. (Alternatively, the modem card may comprise 32 modems each connected to a separate channel of an E1 line). Each modem in the modem card is connected to an internal data bus 240. The internal data bus 240, in turn, is connected to a controller 250 via line 248 and a network interface card 260 via line 249. Controller 250 manages access to bus 240 and stores and downloads appropriate software to each of the modems in modem bank 230. Additionally, controller 250 provides a user interface for configuring RAS 210 and performing other tasks such as data compression, error correction, etc. Controller 250 is also responsible for upper-layer protocol functions and communication associated with LAN/WAN 212, e.g., routing of data, transport services such as flow control of and acknowledgement for data, network management, and transmitting and receiving data packets over LAN/WAN 212 via Network Interface Card (NIC) 260. Controller 250 provides a modem with access to internal data bus to transmit and receive data over bus 240 with NIC 260. NIC 260 typically encapsulates the data in packets with upper-layer protocol header information and transmits the data packet over line 261 to LAN/WAN 212.

While RAS 210 illustrates a single modem bank, wherein each modem in the bank is connected to a DSO of a single T1 line, it is appreciated that RAS 210 may comprise multiple modem banks, each housing a number of modems. Each modem bank may connect to a separate T1 line and communicate with controller 250 to access a separate internal data bus 240 for transmitting data over and receiving data from LAN/WAN 212 via a separate NIC 260. Furthermore, each of the modems can be configured or optimized, via hardware and/or software means, to process different types of digital traffic, e.g., voice, video, audio, or data, depending on the type of bitstream to be processed by each modem.

Figure 4:
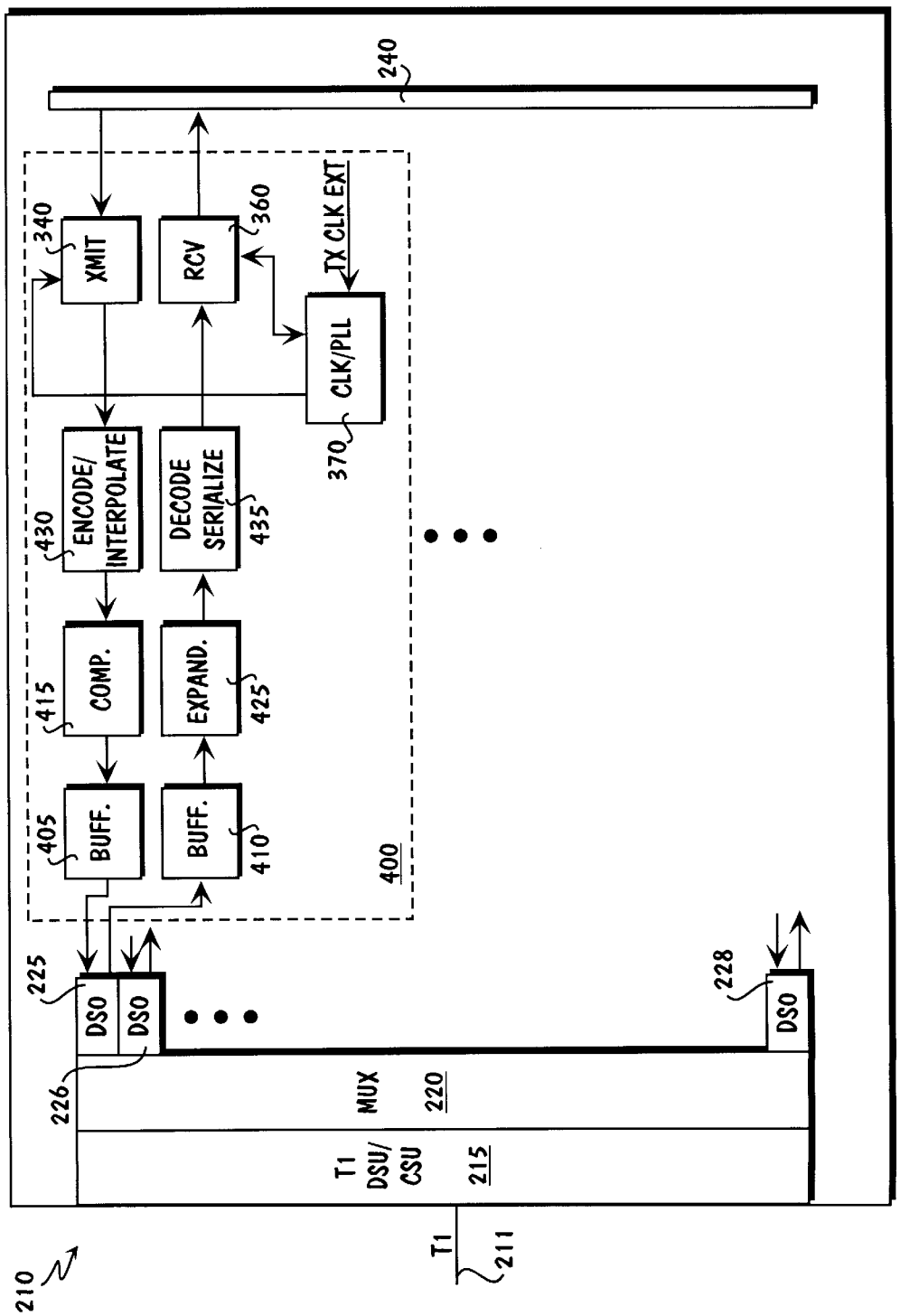
FIG. 4 is a block diagram of a fully digital modem as embodied by the present invention.

With reference to FIG. 4, a block diagram of an embodiment of the digital modem of the present invention is illustrated. While the digital modem illustrated in FIG. 4 is embodied as a modem in a bank of modems in a remote access server, the fully digital nature of the modem is applicable to any modem technology, whether an external, stand-alone modem or one of the internal modems in a remote access server.

Figure 3:
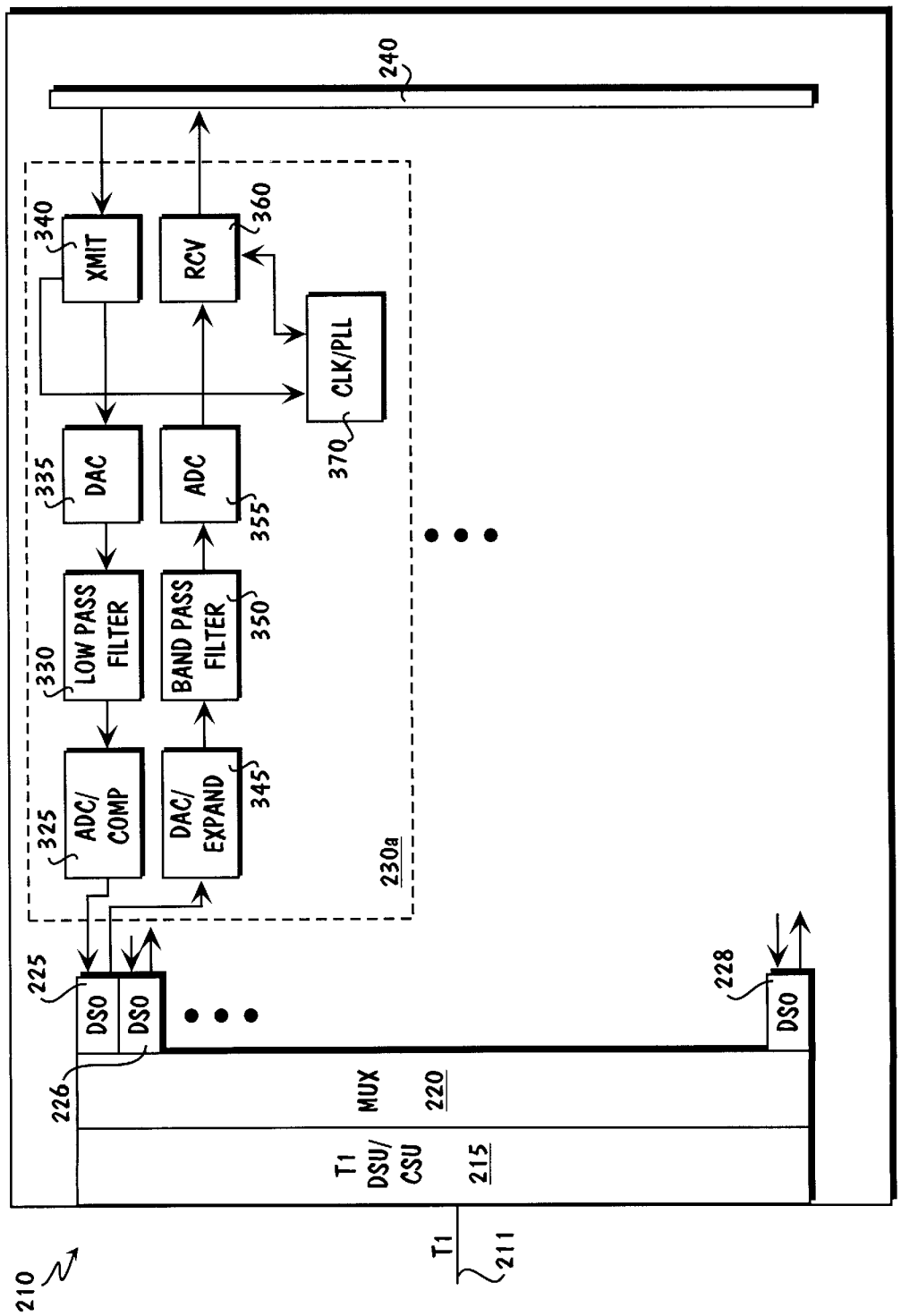
FIG. 3 is a block diagram of a modem within the remote access server illustrated in FIG. 2B.

Digital modem 400 comprises digital signal processing circuitry that executes algorithms for expanding and converting the compressed PCM digital bit stream received from the T1 channel to which it is connected. The bitstream is converted to digital signals of a format and sampling rate utilized by the digital transmission medium of LAN/WAN 212 appropriate for communication with computing device 220. Essentially, the digital modem embodiment illustrated in FIG. 4 interpolates a digital signal from one sampling frequency to another sampling frequency, utilizing only digital signal processing techniques. Unlike the prior art modem 230a illustrated in the block diagram of FIG. 3, no intermediate D/A and A/D conversion of the received digital signal is required. The embodiment of the present invention shown in FIG. 4 removes the need for the analog front end circuitry (DAA, A/D and D/A converters, and filters) and CODEC utilized by the prior art modem in FIG. 3.

Transmitting data from LAN/WAN 212 through RAS 210 to T1 line 211 occurs as follows. A transmitter 340 receives digital signal samples from LAN/WAN 212 via NIC 260 and internal data bus 240 at a baud rate multiple synchronized by clock/phase lock loop circuitry 370 with the modem or the external clock coming from, for example, NIC 260. The samples are forwarded to encoder/interpolator 430, where samples are generated at 8 kHz in synchronization with T1 timing. The samples are converted in to mu-law (or A-law) 8-bit samples by compander 415 and stored in FIFO buffer 405. The samples are transmitted serially from buffer 405 to multiplexer 220, which multiplexes the samples in time domain fashion with other bitstreams to be transmitted over T1 line 211 via DSU/CSU 215. The samples are then transmitted over T1 line 211.

Receiving data from T1 line 211 through RAS 210 to WAN/LAN 212 occurs as follows. Compressed PCM digital signal samples are received at T1 DSU/CSU 215 and demultiplexed by multiplexer 220 into separate channels. FIFO buffer 410 receives the samples and forwards the samples to expander 425 where the samples are expanded (inverse mu-law or A-law). The expanded PCM samples are then interpolated by deocoder/serializer 435 from 8 kHz samples to samples at a baud rate multiple in synchronization with transmitter timing. A timing generation module (not shown) controls the encoder/interpolator and the decoder/serializer, taking into account the differences between the T1 timing and the modem timing. After subtracting far end echo from the signal and resampling the signal, the samples are output by decoder/serializer 435 and forwarded to receiver 360 before being placed on internal data bus 240. Controller 250 controls access to bus 240 for receiver 360 when sending digital signals to NIC 260.

DSP-based Embodiment of the Present Invention

Figure 5:
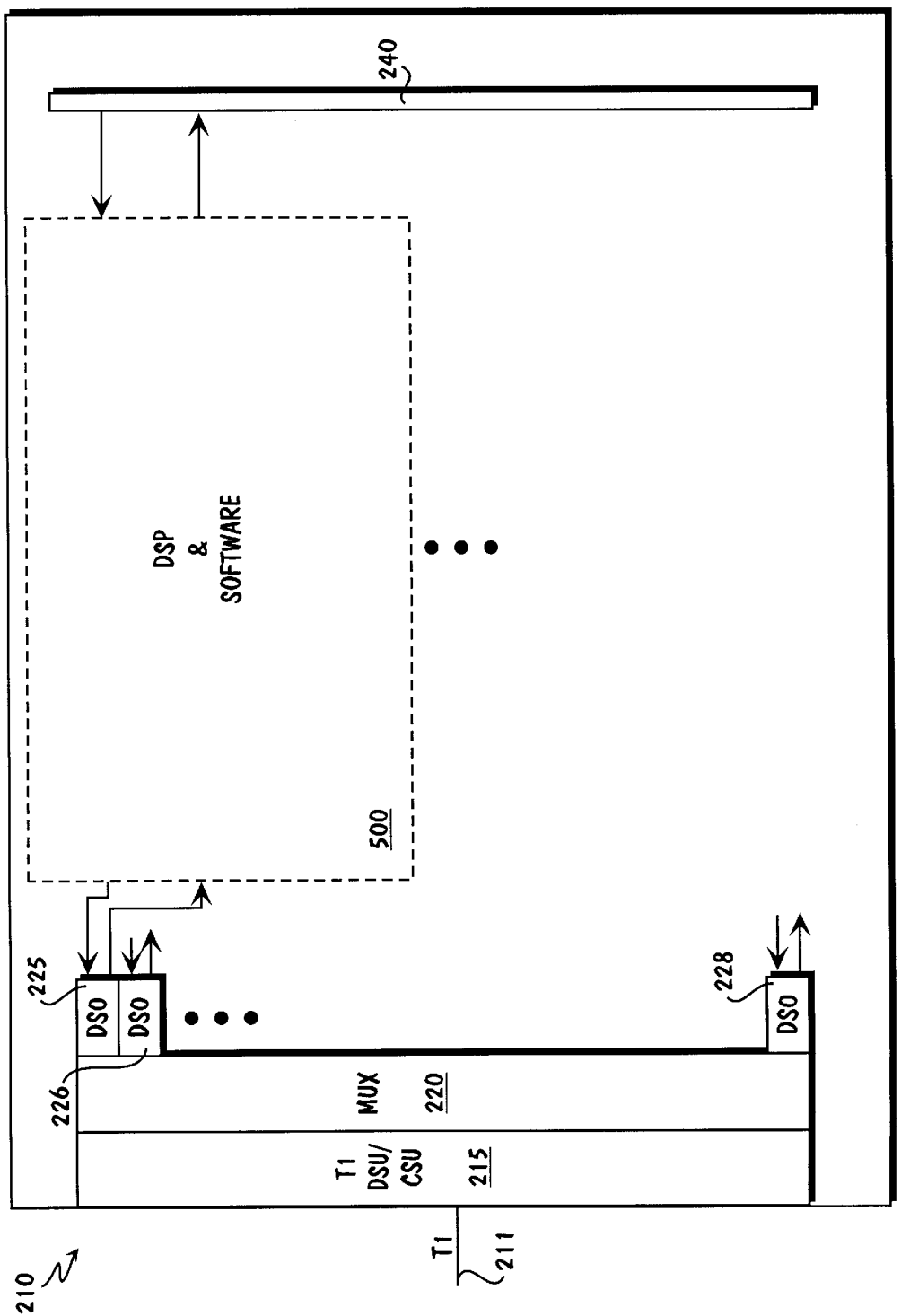
FIG. 5 is a block diagram illustrating an embodiment of the present invention.

With reference to FIGS. 4 and 5, although the embodiment of modem 400 illustrated in FIG. 4 comprises entirely digital circuitry to modulate between different digital signals, according to an alternative embodiment, modem 500 comprises a general purpose Digital Signal Processor (DSP) and accompanying software. Modem 500 offers very efficient as well as flexible implementation of the digital modem. A DSP-based embodiment is particularly advantageous because today's high speed modems must perform nontrivial signal processing tasks, such as data compression, error correction, etc., that are well suited for processing by a DSP. Just as the embodiment illustrated in FIG. 4, a DSP-based fully digital modem 500 does away with the need for the analog front end components such as DAA local loop hardware circuitry and A/D and D/A converters. It is appreciated that while there is a great advantage in utilizing the DSP-based digital modem 500 in a RAS 210 for the reasons stated above, in an alternative embodiment, a stand-alone digital modem might also incorporate the DSP and accompanying software.

The alternative embodiment 500 utilizing a DSP implementation for the digital modem of the present invention provides the ability to download software modules, or images, to the modem. For example, controller 250 can accept input regarding downloading of an image to the modem. Software may be downloaded to upgrade the modem to a new version of software, change the configuration or functionality of the modem, or provide standard or customized features, such as voice compression, error correction, etc., without requiring any hardware changes or onsite personnel to effect the reconfiguration. A flash EEPROM or the like may be utilized to upgrade or change the images available for downloading to the modem. For example, flash EEPROM can be loaded with a new a software module that could then be downloaded to change the configuration, with or without input relating to configuration settings from controller 250, from a modem to a DSU, IDSN Terminal Adapter (ISDN TA), or X.25 PAD. Regardless of what configuration is selected, common hardware, i.e., the DSP, can be utilized. While the DSP-based embodiments described herein are with reference to modem technology, it is understood that such embodiments are generally applicable to related communication technologies, e.g., wire or wireless based forms of data and telecommunications.

Dynamic Downloading of an Image to DSP-based Modem

Moreover, the present invention contemplates dynamic downloading of an image to a DSP, e.g., a DSP in a digital modem. In this manner, diverse applications such as Internet phone, Internet video phone, fax, audio, video, etc., may be processed by the same modem simply by changing the image loaded in to the modem whenever switching between applications. An appropriate algorithm, or image, may be dynamically downloaded to the DSP from an image repository, e.g., EEPROM, flash EEPROM, CD-ROM, static or dynamic random access memory, magnetic media, etc, internal or external to modem bank 230 or RAS 210, having stored therein different images. (In the case of a modem connected or internal to PC 100, the image repository may reside in the modem, PC or an external data storage device). Modem 500 may directly access the image repository directly via an internal data bus, e.g., internal data bus 240, or external data bus. Alternatively, controller 250 may control, with or without input from a user via a user interface, access to the repository.

While the embodiment illustrated in FIG. 5 shows a DSP dynamically configured with a software image in a modem 500 installed in a modem bank 230 of RAS 210, it is contemplated that the DSP may be installed in any modem, which modem may be internally or externally connected to RAS 210, or internally or externally connected to, e.g., PC 100, or other computing device.

The timing of the dynamic download of an image to the DSP in modem 500 may be event driven. For example, an image may be downloaded during call set-up, power up, reset, or other event. Additionally, dynamic download of an image may be interrupt-driven. Finally, it is contemplated that dynamic download of a particular image may be driven by the content of the data stream received from a remote device, e.g., PC 100, or a local device, e.g., computing device 220. For example, a modem may request or command a download of a particular image based on different DTMF tones for fax, voice, video or data, or based on different telephone numbers received, for example, as a result of PC 100 initiating communication with computing device 220.

What is claimed is:

1. A digital modem, comprising:
   means for receiving a digital signal at a first sampling rate from a first device;
   means for buffering said digital signal from the first device;
   digital means for expanding the buffered digital signal;
   means for interpolating the expanded digital signal from a first sampling rate to a digital signal at a second sampling rate;
   means for subtracting far end echo from the interpolated digital signal;
   means for resampling the interpolated digital signal from which the far end echo has been subtracted; and
   means for transmitting the resampled interpolated digital signal to a second device.

2. The digital modem of claim 1, wherein the means for receiving a digital signal at a first sampling rate from a first device comprises means for receiving a compressed pulse code modulation digital signal from a first device.

3. The digital modem of claim 1, wherein the means for expanding the buffered digital signal comprises a mu-law inverse compander circuit.

4. The digital modem of claim 1, wherein the means for expanding the buffered digital signal comprises an A-law inverse compander circuit.

5. The digital modem of claim 1, further comprising:
   means for receiving a digital signal at a second sampling rate from said second device;
   digital means for interpolating the digital signal at a second sampling rate from said second device to a digital signal at a first sampling rate;
   digital means for compressing said digital signal at a first sampling rate from said second device; and
   means for buffering said compressed digital signal at a first sampling rate to be transmitted at said first sampling rate to said first device.

6. The digital modem of claim 5, wherein the means for receiving a digital signal from a first device comprises means for receiving a compressed pulse code modulation digital signal at a sampling rate of 8000 samples per second from a first device.

7. The digital modem of claim 5, wherein the digital means for compressing said digital signal at a first sampling rate comprises a mu-law compander circuit.

8. The digital modem of claim 5, wherein the digital means for compressing said digital signal at a first sampling rate comprises an A-law compander circuit.

9. The digital modem of claim 5, wherein said digital means for interpolating the digital signal at a second sampling rate from said second device to a digital signal at a first sampling rate comprises:
   means for converting said digital signal from said second device at a second sampling rate to a pulse code modulation digital signal.

10. The digital modem of claim 9, wherein said digital means for compressing said digital signal at a first sampling rate from said second device comprises means for compressing said pulse code modulation digital signal to create a compressed pulse code modulation digital signal.

11. A method for modulating a data signal transmitted between a first device and a second device communicatively coupled to transmit said data signal therebetween, comprising the steps of:
    receiving a digital signal at a first sampling rate from a first device;
    buffering said digital signal from the first device;
    digitally expanding the buffered digital signal;
    interpolating the expanded digital signal from a first sampling rate to a digital signal at a second sampling rate;
    subtracting far end echo from the interpolated digital signal;
    resampling the interpolated digital signal from which the far end echo has been subtracted; and
    transmitting the resampled digital signal to a second device.

12. The method of claim 11, wherein receiving a digital signal at a first sampling rate from said first device comprises the step of receiving a compressed pulse code modulation digital signal at a sampling rate of 8000 samples per second from a first device.

13. The method of claim 12, wherein the step of digitally converting said digital data of a first format to a digital signal of a second format comprises the step of digitally converting said compressed pulse code modulation digital signal to said digital signal of a second format.

14. The method of claim 13, wherein the step of digitally converting said compressed pulse code modulation digital signal to said digital signal of a second format comprises the steps of:

a) digitally expanding said compressed pulse code modulation digital signal to create a pulse code modulation digital signal; and b) digitally converting said pulse code modulation digital signal to said data signal of a second format.

15. The method of claim 11, wherein digitally expanding said buffered digital signal comprises digitally expanding said compressed pulse code modulation digital signal according to the mu-law standard inverse compression method to create a pulse code modulation digital signal.

16. The method of claim 11, wherein digitally expanding said buffered digital signal comprises digitally expanding said compressed pulse code modulation digital signal according to the A-law standard inverse compression method to create a pulse code modulation digital signal.

17. A digital modem, comprising:

a receiver to receive a digital signal at a first sampling rate from a first device;

a buffer communicatively coupled to the receiver for buffering said digital signal;

an inverse compander circuit communicatively coupled to the buffer for expanding the buffered digital signal;

a decoder circuit communicatively coupled to said inverse compander circuit for interpolating the expanded digital signal from a first sampling rate to a digital signal at a second sampling rate;

a subtractor circuit communicatively coupled to the decoder circuit for subtracting far end echo from the interpolated digital signal;

a resampler circuit communicatively coupled to the subtractor circuit for resampling the interpolated digital signal from which the far end echo has been subtracted; and a transmitter for transmitting said digital signal of a different format to a second device.

18. The digital modem of claim 17, wherein the inverse compander comprises a mu-law inverse compander circuit.

19. The digital modem of claim 17, wherein the inverse compander circuit comprises an A-law inverse compander circuit.

20. The digital modem of claim 17, further comprising:

a second receiver for receiving a digital signal at a second sampling rate from said second device;

an encoder circuit communicatively coupled to the second receiver to interpolate the digital signal at a second sampling rate to a digital signal at a first sampling rate;

a compander circuit communicatively coupled to the encoder for compressing the interpolated digital signal;

a buffer communicatively coupled to the compander circuit for buffering the compressed digital signal; and a second transmitter to transmit said compressed digital signal at a first sampling rate to a first device.

21. The digital modem of claim 20, wherein the receiver receives a compressed PCM digital signal at a sampling rate of 8000 samples per second from the first device.

22. The digital modem of claim 20, wherein the compander circuit comprises a mu-law compander circuit.

23. The digital modem of claim 20, wherein the compander circuit comprises an A-law compander circuit.

24. The digital modem of claim 17, wherein a digital signal processor comprises the inverse compander circuit, the decoder circuit, the subtractor circuit, and the resampler circuit.

25. The digital modem of claim 20, wherein a digital signal processor comprises the inverse compander circuit, the decoder circuit, the subtractor circuit, the resampler circuit, the encoder circuit, and the compander circuit.

* * * * *